United States Patent
Fujio

(10) Patent No.: US 11,047,425 B2
(45) Date of Patent: Jun. 29, 2021

(54) STATIONARY CONSTANT-VELOCITY UNIVERSAL JOINT

(71) Applicant: NTN CORPORATION, Osaka (JP)

(72) Inventor: Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 433 days.

(21) Appl. No.: 16/077,149

(22) PCT Filed: Feb. 3, 2017

(86) PCT No.: PCT/JP2017/003963
§ 371 (c)(1),
(2) Date: Aug. 10, 2018

(87) PCT Pub. No.: WO2017/141731
PCT Pub. Date: Aug. 24, 2017

(65) Prior Publication Data
US 2019/0024723 A1 Jan. 24, 2019

(30) Foreign Application Priority Data
Feb. 15, 2016 (JP) .............................. JP2016-025899

(51) Int. Cl.
*F16D 3/227* (2006.01)
*F16D 3/224* (2011.01)
(Continued)

(52) U.S. Cl.
CPC ............. *F16D 3/227* (2013.01); *F16D 3/224* (2013.01); *F16D 3/2237* (2013.01);
(Continued)

(58) Field of Classification Search
CPC ........ F16D 3/227; F16D 3/224; F16D 3/2237; F16D 3/2245; F16D 2300/12;
(Continued)

(56) References Cited

U.S. PATENT DOCUMENTS 3,475,924 A * 11/1969 Aucktor ................. F16D 3/223
464/144
6,135,891 A 10/2000 Sone et al.
(Continued)

FOREIGN PATENT DOCUMENTS

JP          11-101256        4/1999
JP          2012-246952      12/2012
(Continued)

OTHER PUBLICATIONS

International Preliminary Report on Patentability and Written Opinion of the International Searching Authority dated Aug. 21, 2018 in International (PCT) Patent Application No. PCT/JP2017/003963.
(Continued)

*Primary Examiner* — Greg Binda
(74) *Attorney, Agent, or Firm* — Wenderoth, Lind & Ponack, L.L.P.

(57) ABSTRACT

In a fixed type constant velocity universal joint, an axial offset amount of a curvature center of each of track grooves of outer and inner joint members is set to 0. The track grooves of the outer and inner joint members are each inclined with respect to an axis line. The track grooves adjacent to each other in a circumferential direction are inclined in opposite directions. The track grooves of the outer and inner joint members that are opposed to each other are inclined with respect to the axis line in opposite directions. A chamfered portion is formed on a track inlet end of each of the track grooves of the outer joint member. When the cage and the inner joint member are inclined with respect to the outer joint member, balls are incorporated into two cage windows at the same time through the chamfered portions.

8 Claims, 21 Drawing Sheets

(51) Int. Cl.
  *F16D 3/2237* (2011.01)
  *F16D 3/2245* (2011.01)
  *F16D 3/223* (2011.01)
(52) U.S. Cl.
  CPC .. *F16D 3/2245* (2013.01); *F16D 2003/22309* (2013.01); *F16D 2300/10* (2013.01); *F16D 2300/12* (2013.01); *Y10S 464/906* (2013.01)
(58) Field of Classification Search
  CPC ....... F16D 2003/22309; F16D 2300/10; Y10S 464/906
  USPC ........................................................ 464/144
  See application file for complete search history.

(56) References Cited

U.S. PATENT DOCUMENTS

| | | | | |
|---|---|---|---|---|
| 8,388,456 | B2 * | 3/2013 | Yamazaki | F16D 3/2245 464/906 |
| 10,458,480 | B2 * | 10/2019 | Yoshii | F16D 3/2245 |
| 2014/0080612 | A1 | 3/2014 | Fujio | |

FOREIGN PATENT DOCUMENTS

| | | |
|---|---|---|
| JP | 5101430 | 12/2012 |
| JP | 5138449 | 2/2013 |
| JP | 2014-095404 | 5/2014 |
| JP | 5484769 | 5/2014 |
| JP | 5734742 | 6/2015 |

OTHER PUBLICATIONS

Notice of Reasons for Refusal dated Mar. 6, 2020 in corresponding Japanese Patent Application 2016-025899, with English Translation.

International Search Report dated Apr. 25, 2017 in International (PCT) Application No. PCT/JP2017/003963.

Extended European Search Report dated Sep. 11, 2019 in corresponding European Patent Application No. 17752993.0.

* cited by examiner

STATIONARY CONSTANT-VELOCITY UNIVERSAL JOINT

TECHNICAL FIELD

The present invention relates to a fixed type constant velocity universal joint, which is to be applied to automobiles and various other industrial machines.

BACKGROUND ART

As fixed type constant velocity universal joints, there are known constant velocity universal joints such as a Barfield type (BJ) and an undercut-free type (UJ). In recent years, there are also given a BJ and a UJ of an eight-ball type, which are reduced in weight and size, and various fixed type constant velocity universal joints are selectively used depending on a purpose.

Further, even in the eight-ball type, contact between an outer spherical surface of a cage and an inner spherical surface of an outer joint member and contact between an inner spherical surface of the cage and an outer spherical surface of an inner joint member cause heat generation, and thus, there is a risk in that the durability is degraded. In view of the above, there have been proposed various constant velocity universal joints of a track crossing type, in which the contact between the outer spherical surface of the cage and the inner spherical surface of the outer joint member and the contact between the inner spherical surface of the cage and the outer spherical surface of the inner joint member are reduced with an aim to achieve reduction in heat generation (Patent Literature 1 to Patent Literature 3).

In FIG. 22 to FIG. 40, there is illustrated a fixed type constant velocity universal joint in which eight balls being torque transmitting members are provided, axial offset amounts of curvature centers of track grooves are set to 0, and the adjacent track grooves are inclined.

The fixed type constant velocity universal joint includes an outer joint member 3, an inner joint member 6, a plurality of balls 7, and a cage 8. The outer joint member 3 has a plurality of track grooves 2 formed in an inner spherical surface 1 thereof. The inner joint member 6 has a plurality of track grooves 5, which are paired with the track grooves 2 of the outer joint member 3, and are formed in an outer spherical surface 4 thereof. The plurality of balls 7 are interposed between the track grooves 2 of the outer joint member 3 and the track grooves 5 of the inner joint member 6, and are configured to transmit torque. The cage 8 is interposed between the inner spherical surface 1 of the outer joint member 3 and the outer spherical surface 4 of the inner joint member 6, and is configured to retain the balls 7.

Axial offset amounts of a curvature center O1 of the track groove 2 of the outer joint member 3 and a curvature center O2 of the track groove 5 of the inner joint member 6 are set to 0. That is, the curvature center O1 and the curvature center O2 match with a joint center O.

As illustrated in FIG. 24 to FIG. 26, in the outer joint member 3, each of the track grooves 2 is inclined with respect to an axial direction. In this case, the track grooves 2 adjacent to each other in a circumferential direction are inclined in opposite directions. That is, as illustrated in FIG. 26, when a track groove 2A is inclined with respect to an axis line L by an angle γ in a clockwise direction from a far side to an opening side, a track groove 2B adjacent to this track groove 2A in the clockwise direction is inclined with respect to the axis line L by γ in a counterclockwise direction from the far side to the opening side. Further, as illustrated in FIG. 27, the curvature center O1 of each of the track grooves 2 and a curvature center O5 of the inner spherical surface 1 match with each other without being offset.

Further, as illustrated in FIG. 28 to FIG. 30, in the inner joint member 6, each of the track grooves 5 is inclined with respect to the axial direction. In this case, the track grooves 5 adjacent to each other in the circumferential direction are inclined in opposite directions. That is, as illustrated in FIG. 30, when a track groove 5A is inclined with respect to the axis line L by the angle γ (the same angle as that of the track groove 2 of the outer joint member 3) in the counterclockwise direction from the far side to the opening side, another track groove 5B adjacent to this track groove 5A in the clockwise direction is inclined with respect to the axis line L by γ in the clockwise direction from the far side to the opening side. Further, as illustrated in FIG. 31, the curvature center O2 of each of the track grooves 5 and a curvature center O6 of the outer spherical surface 4 match with each other without being offset.

As illustrated in FIG. 32 and FIG. 33, the cage 8 is an annular member, and a plurality of cage windows 8d configured to receive the balls 7 (see FIG. 22) are arrayed in a peripheral wall of the cage 8 along the circumferential direction. Further, as illustrated in FIG. 34, a curvature center O7 of the outer spherical surface 8a and a curvature center O8 of the inner spherical surface 8b match with each other.

Using the constant velocity universal joints which are described above is becoming an effective measure for meeting environmental performance required for automobiles in recent years. Further, the constant velocity universal joint of the track crossing type is small in heat generation, and hence can exert performance not only in a drive shaft, but also in a propeller shaft configured to transmit rotational driving power from a transmission to a differential in a four-wheel drive vehicle (4WD vehicle) or a rear-wheel drive vehicle (FR vehicle).

CITATION LIST

Patent Literature 1: JP 5138449 B2
Patent Literature 2: JP 5101430 B2
Patent Literature 3: JP 5734742 B2

SUMMARY OF INVENTION

Technical Problem

Incidentally, as described above, in the fixed type constant velocity universal joint in which the eight balls being torque transmitting members are provided, the axial offset amounts of the curvature centers of the track grooves 2 and 5 are set to 0, and the adjacent track grooves 2A and 2B (5A and 5B) are inclined, similarly to a general fixed type constant velocity universal joint, as illustrated in FIG. 35, the balls 7 are incorporated in a state in which internal components (the inner joint member and the cage) are inclined with respect to the axial center of the outer joint member 3.

In such a case, the length of the cage windows 8d is set so as to prevent interference between the balls 7 and cage window columns 8c at positions (phases) other than a phase for incorporation of the balls. In the fixed type constant velocity universal joint of the eight-ball BJ type, in which the axial track offset amounts are set to 0, and the adjacent track grooves 2A and 2B (5A and 5B) alternately cross each other, the adjacent track grooves 2A and 2B (5A and 5B) cross each other. Thus, forces of pressing the cage windows 8*d* in opposite directions are generated in the adjacent tracks 2A and 2B (5A and 5B), and large stresses are applied to the cage window columns.

Therefore, the window columns 8*c* of the cage 8 are required to be thickened to the extent possible. In Patent Literature 3, focus is given to movement amounts and incorporation phases of the balls inside the cage windows of the cage, and there is proposed a structure in which a required window length is reduced to secure the cage window columns. However, in a case in which an operating angle is increased (case in which the track length is increased), the force that acts on the cage is increased, and in addition, the length of the cage windows is required to be increased. Thus, the cage window columns become thinner. Even when the structure of Patent Literature 3 is applied, the cage window columns cannot be sufficiently secured.

Incidentally, when the two cage windows 8*d* and 8*d* adjacent to each other along the circumferential direction are exposed from the outer joint member 3 as illustrated in FIG. 38 and FIG. 39, the balls can be incorporated into the two cage windows 8*d* and 8*d* at the same time. In this case, a length W1 of the cage windows 8*d* (see FIG. 36 and FIG. 37) is required to be set so as to prevent interference between the balls 7 and the cage window columns 8*c* of the cage 8 at the positions (phases) other than the phase for incorporation of the balls.

That is, when the balls are to be incorporated into the two cage windows 8*d* and 8*d* at the same time, it is required to prevent contact with spigot edges E (see FIG. 38 and FIG. 39) of the track grooves 2 of the outer joint member 3. Therefore, it is required that inclination angles of the internal components (the inner joint member 6 and the cage 8) be increased, and that a movement amount L1 (see FIG. 36) of the ball 7 in the circumferential direction be increased.

When an inclination angle $\theta 1$ is increased, the incorporation workability is degraded. Further, when the movement amount L1 of the ball 7 in the circumferential direction is increased, the circumferential lengths of the cage windows 8*d* and 8*d* are required to be increased. As described above, when the circumferential lengths of the cage windows 8*d* and 8*d* are increased, the cage window column 8*c* between the cage windows adjacent to each other in the circumferential direction (minimum circumferential length t1 (see FIG. 37)) becomes smaller, with the result that the strength of the cage 8 is degraded.

Incidentally, in FIG. 38 and FIG. 39, a side on which the circumferential spherical surface width between the track grooves 5 and 5 adjacent to each other in the circumferential direction in the outer spherical surface 4 of the inner joint member 6 is smaller is inclined toward a joint opening side. On the contrary, in FIG. 40, a side on which the circumferential spherical surface width between the track grooves 5 and 5 adjacent to each other in the circumferential direction in the outer spherical surface 4 of the inner joint member 6 is larger is inclined toward the joint opening side. Even in the case of the inclination as in FIG. 40, as in the case of the inclination as illustrated in FIG. 38 and FIG. 39, the balls can be incorporated into the two cage windows 8*d* and 8*d* at the same time. Similarly, the incorporation workability is degraded, and the window column between the cage windows adjacent to each other in the circumferential direction becomes smaller, with the result that the strength of the cage 8 is degraded.

In view of the above, the present invention provides a fixed type constant velocity universal joint of an eight-ball crossing track BJ type, which can attain a large operating angle, increase the strength of a cage, and improve the assemblability.

Solution to Problem

According to one embodiment of the present invention, there is provided a fixed type constant velocity universal joint, comprising: an outer joint member having eight track grooves formed in an inner spherical surface thereof; an inner joint member having eight track grooves, which are paired with the track grooves of the outer joint member, and are formed in an outer spherical surface thereof; eight balls, which are interposed between the track grooves of the outer joint member and the track grooves of the inner joint member, and are configured to transmit torque; and a cage, which is interposed between the inner spherical surface of the outer joint member and the outer spherical surface of the inner joint member, and comprises cage windows configured to retain the balls, wherein an axial offset amount of a curvature center of each of the track grooves of the outer joint member and an axial offset amount of a curvature center of the inner spherical surface of the outer joint member are set to 0, and an axial offset amount of a curvature center of each of the track grooves of the inner joint member and an axial offset amount of a curvature center of the outer spherical surface of the inner joint member are set to 0, wherein the track grooves of the outer joint member and the track grooves of the inner joint member are each inclined with respect to an axis line, wherein the track grooves adjacent to each other in a circumferential direction are inclined in opposite directions, wherein the track grooves of the outer joint member and the track grooves of the inner joint member, which are opposed thereto, are inclined with respect to the axis line in opposite directions, wherein a chamfered portion is formed on a track inlet end of each of the track grooves of the outer joint member, and wherein, in a state in which the cage and the inner joint member are inclined with respect to the outer joint member so that two cage windows are exposed from the outer joint member, the balls are enabled to be incorporated into the two cage windows at the same time through the chamfered portions on the track inlet ends.

According to the present invention, the chamfered portion is formed on the track inlet end of each of the track grooves of the outer joint member. Thus, a space of an inlet spigot edge portion of the outer joint member and a cage window surface, which is required for incorporation of the ball, can be increased. Therefore, an operating angle required for the incorporation becomes smaller, and a movement amount of the ball in the circumferential direction can be reduced.

Even when a shape, a size, and a position of each of the chamfered portions are set so that the balls are enabled to be incorporated into a pair of track grooves at the same time in a state in which a side on which a circumferential spherical surface width between the pair of track grooves adjacent to each other in the circumferential direction in the outer spherical surface of the inner joint member is larger is inclined toward a joint opening side, the shape, the size, and the position of each of the chamfered portions may be set so that the balls are enabled to be incorporated into the pair of track grooves at the same time in a state in which a side on which the circumferential spherical surface width between the pair of track grooves adjacent to each other in the circumferential direction in the outer spherical surface of the inner joint member is smaller is inclined toward the joint opening side.

Further, the curvature center of the each of the track grooves of the outer joint member and the curvature center of the each of the track grooves of the inner joint member may be offset in a radial direction with respect to a joint center. The track grooves of the outer joint member and the track grooves of the inner joint member, which are opposed to the track grooves of the outer joint member, may construct ball tracks which each allow one ball to be incorporated thereinto, and a length of each of the ball tracks may be set to a length required for a front drive shaft.

Advantageous Effects of Invention

In the present invention, the space required for the incorporation of the ball can be increased, and inclination angles of internal components comprising the cage and the inner joint member can be reduced, thereby being capable of enhancing the ease of incorporation of the balls. Further, the movement amount of the ball in the circumferential direction can be reduced, and thus, the length of the cage windows of the cage can be shortened, thereby being capable of increasing the strength of the cage window column between the cage windows.

DESCRIPTION OF EMBODIMENTS

Figure 1:
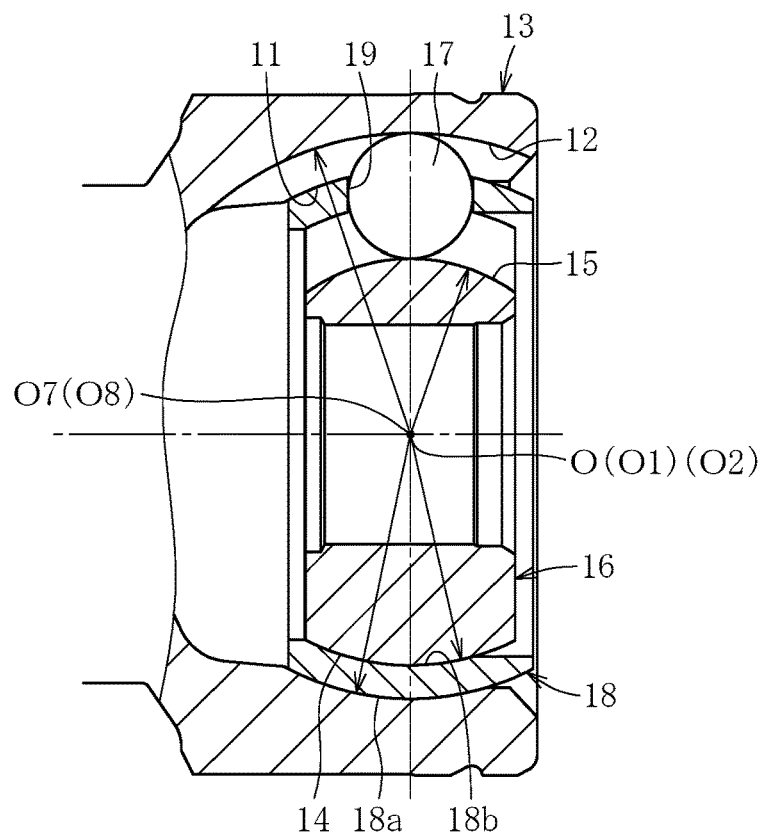
FIG. 1 is a sectional view of a fixed type constant velocity universal joint of the present invention.
Figure 2:
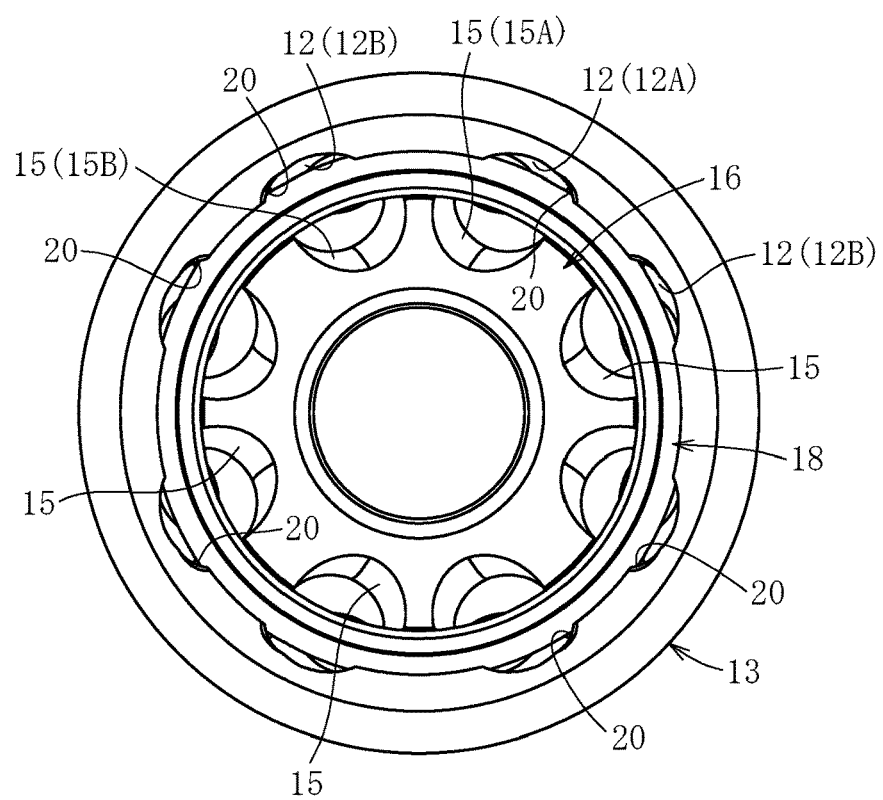
FIG. 2 is a front view of the fixed type constant velocity universal joint illustrated in FIG. 1.
Figure 3:
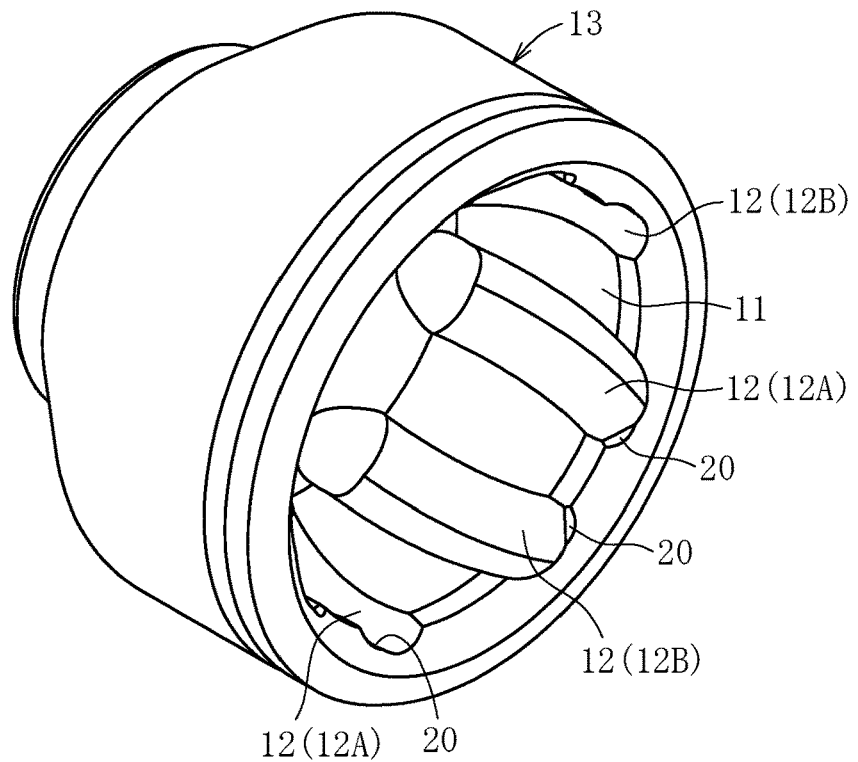
FIG. 3 is a perspective view of an outer joint member of the fixed type constant velocity universal joint illustrated in FIG. 1.

Now, an embodiment of the present invention is described with reference to FIG. 1 to FIG. 21. A fixed type constant velocity universal joint according to the embodiment is illustrated in FIG. 1 and FIG. 2. The fixed type constant velocity universal joint is a Barfield type (BJ), and comprises an outer joint member 13, an inner joint member 16, eight balls 17, and a cage 18. The outer joint member 13 has eight track grooves 12 formed in an inner spherical surface 11 thereof. The inner joint member 16 has eight track grooves 15, which are paired with the track grooves 12 of the outer joint member 13, and are formed in an outer spherical surface 14 thereof. The balls 17 are interposed between the track grooves 12 of the outer joint member 13 and the track grooves 15 of the inner joint member 16, and are configured to transmit torque. The cage 18 is interposed between the inner spherical surface 11 of the outer joint member 13 and the outer spherical surface 14 of the inner joint member 16, and is configured to retain the balls 17.

Axial offset amounts of a curvature center O1 of the track groove 12 of the outer joint member 13 and a curvature center O2 of the track groove 15 of the inner joint member 16 are set to 0. That is, the curvature center O1 and the curvature center O2 match with a joint center O.

Figure 4:
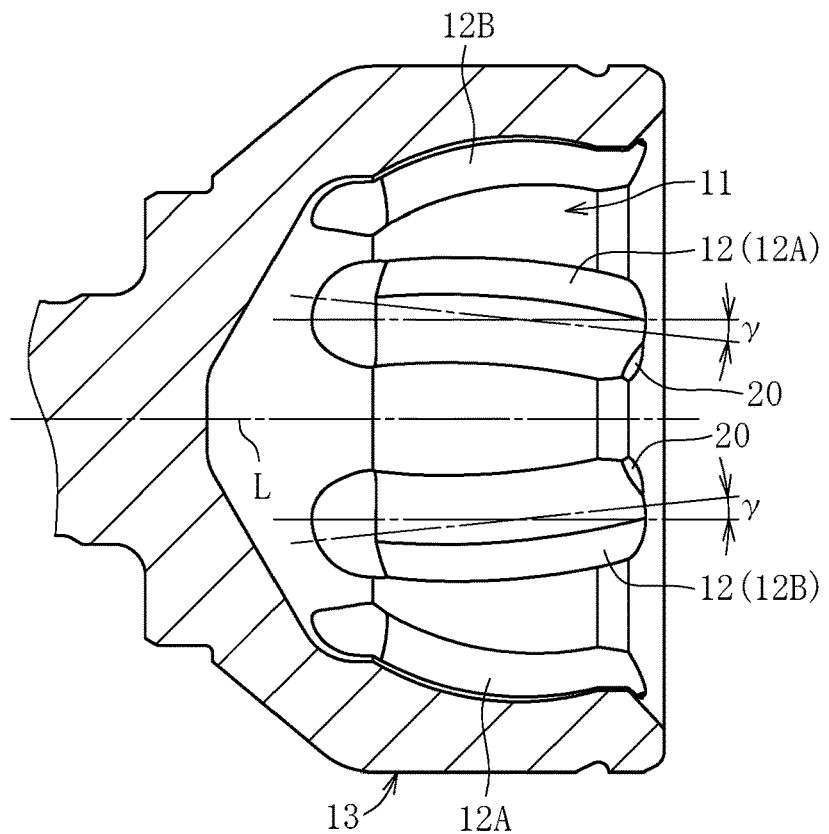
FIG. 4 is a sectional view of the outer joint member of the fixed type constant velocity universal joint illustrated in FIG. 1.
Figure 5:
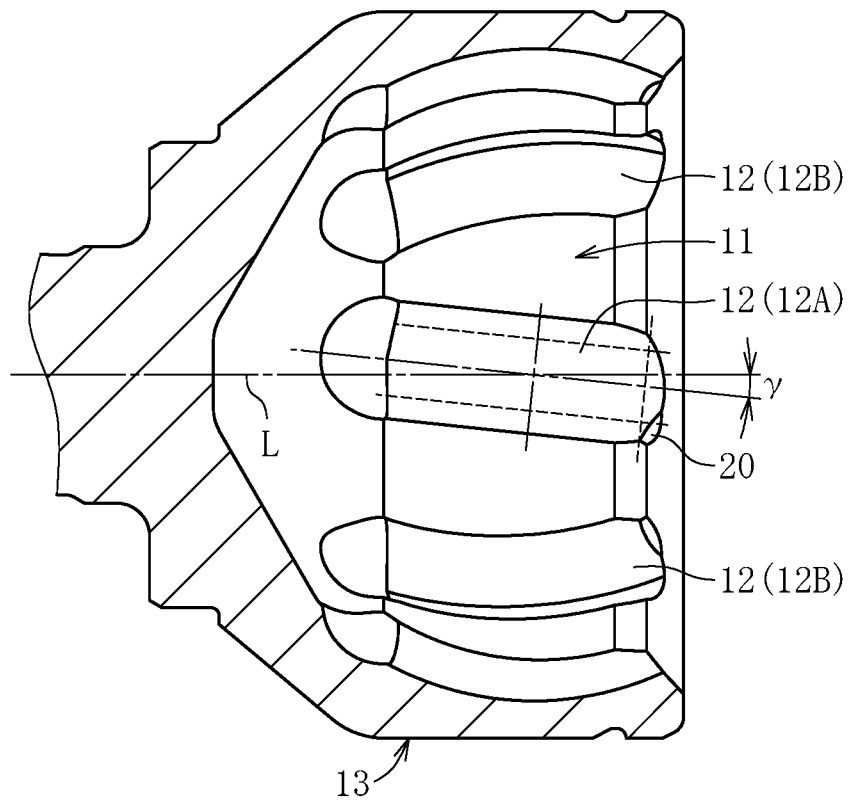
FIG. 5 is a sectional view of the outer joint member of the fixed type constant velocity universal joint illustrated in FIG. 1.
Figure 6:
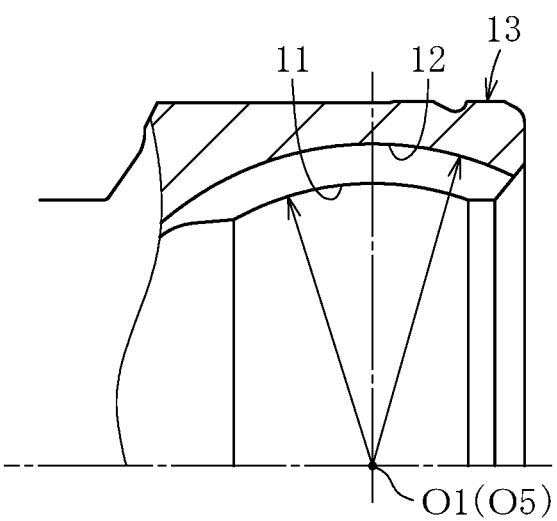
FIG. 6 is a main-part sectional view of the outer joint member of the fixed type constant velocity universal joint illustrated in FIG. 1.
Figure 7:
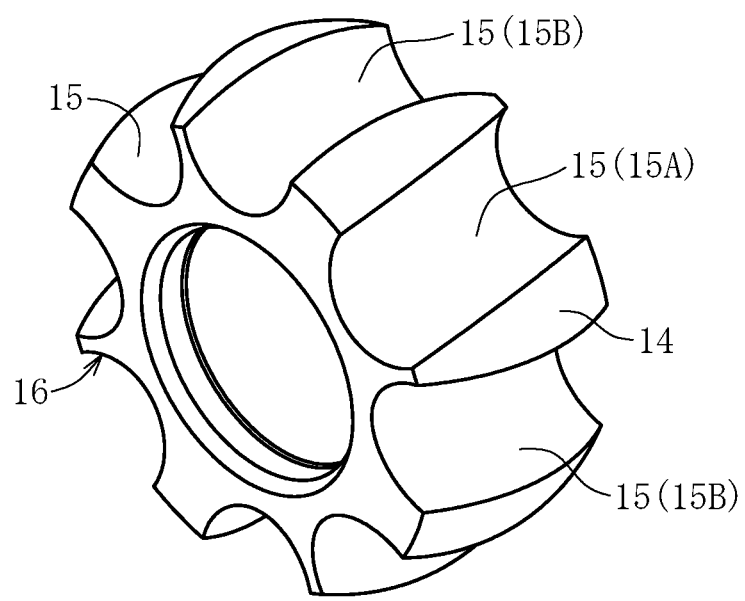
FIG. 7 is a perspective view of an inner joint member of the fixed type constant velocity universal joint illustrated in FIG. 1.
Figure 8:
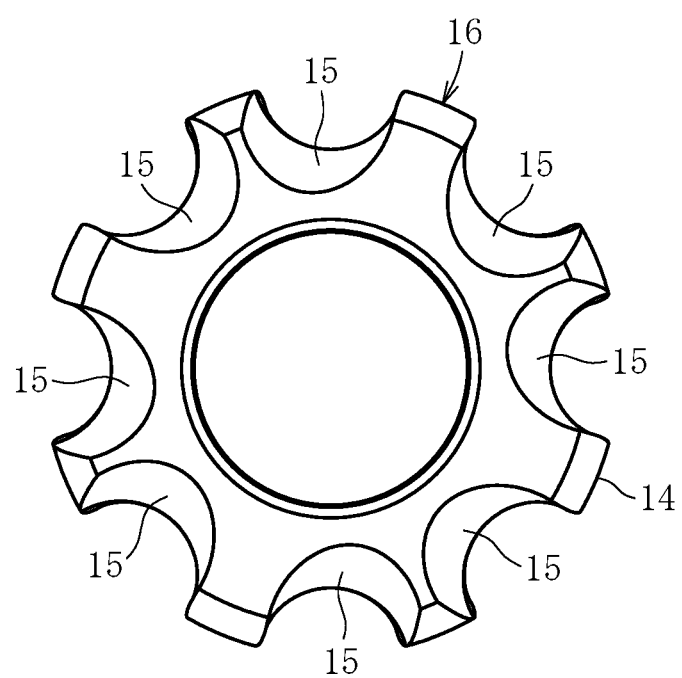
FIG. 8 is a front view of the inner joint member of the fixed type constant velocity universal joint illustrated in FIG. 1.

As illustrated in FIG. 3 to FIG. 6, in the outer joint member 13, each of the track grooves 12 is inclined with respect to the axial direction. In this case, the track grooves 12 adjacent to each other in a circumferential direction are inclined in opposite directions. That is, as illustrated in FIG. 4, when a track groove 12A is inclined with respect to an axis line L by an angle γ in a clockwise direction from a far side to an opening side, another track groove 12B adjacent to this track groove 12A in the clockwise direction is inclined with respect to the axis line L by γ in a counterclockwise direction from the far side to the opening side. Further, as illustrated in FIG. 6, the curvature center O1 of each of the track grooves 12 and a curvature center O5 of the inner spherical surface 11 match with each other without being offset.

Figure 9:
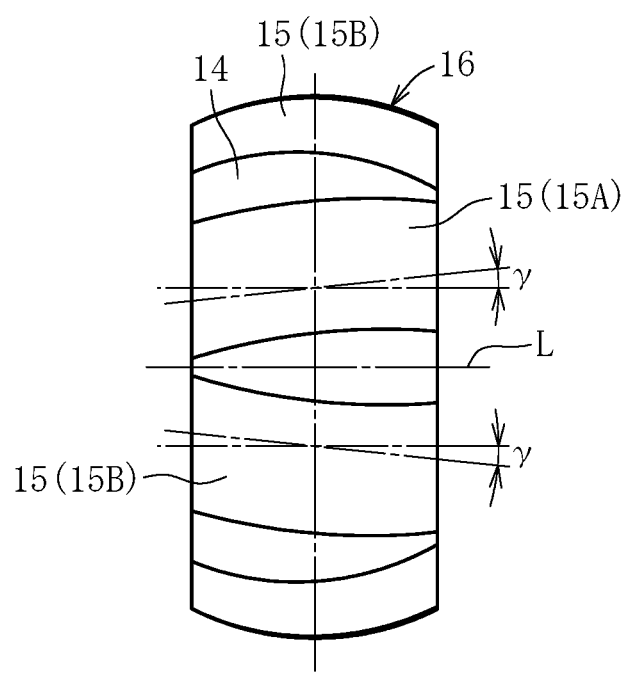
FIG. 9 is a side view of the inner joint member of the fixed type constant velocity universal joint illustrated in FIG. 1.
Figure 10:
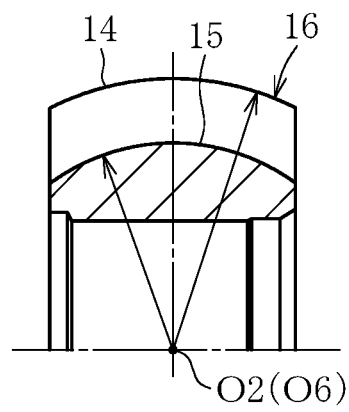
FIG. 10 is a main-part sectional view of the inner joint member of the fixed type constant velocity universal joint illustrated in FIG. 1.

Further, as illustrated in FIG. 7 to FIG. 10, in the inner joint member 16, each of the track grooves 15 is inclined with respect to the axial direction. In this case, the track grooves 15 adjacent to each other in the circumferential direction are inclined in opposite directions. That is, as illustrated in FIG. 9, when a track groove 15A is inclined with respect to the axis line L by the angle γ (the same angle as that of the track groove 12 of the outer joint member 13) in the counterclockwise direction from the far side to the opening side, another track groove 15B adjacent to this track groove 15A in the clockwise direction is inclined with respect to the axis line L by γ in the clockwise direction from the far side to the opening side. Further, as illustrated in FIG. 10, the curvature center O2 of each of the track grooves 15 and a curvature center O6 of the outer spherical surface 14 match with each other without being offset.

Figure 11:
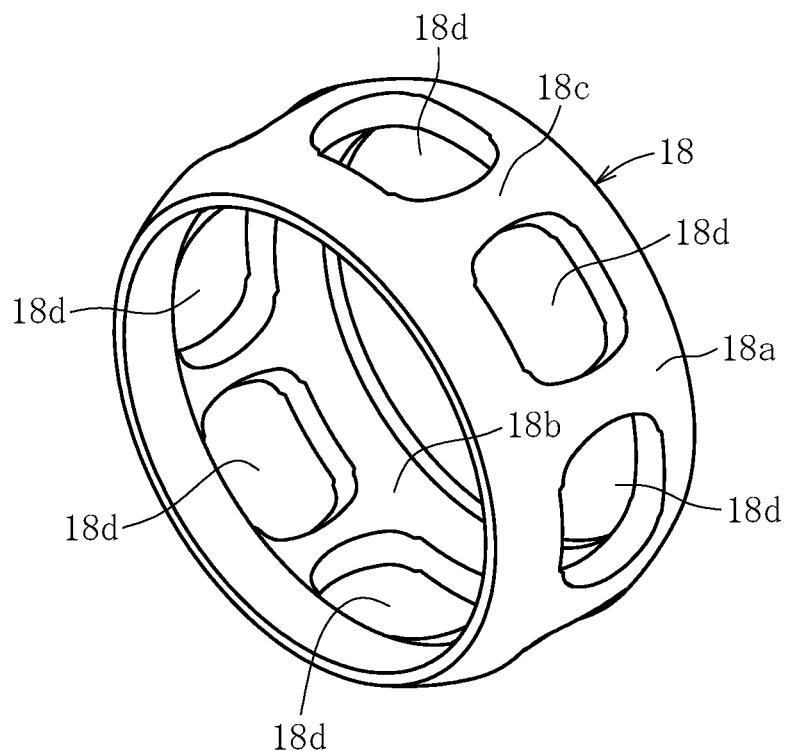
FIG. 11 is a perspective view of a cage of the fixed type constant velocity universal joint illustrated in FIG. 1.
Figure 12:
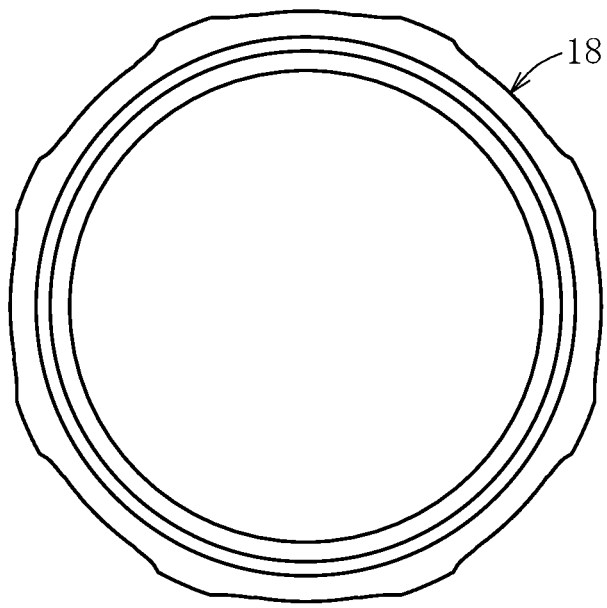
FIG. 12 is a front view of the cage of the fixed type constant velocity universal joint illustrated in FIG. 1.

As illustrated in FIG. 11 and FIG. 12, the cage 18 is an annular member, and as illustrated in FIG. 11, a plurality of cage windows 18d configured to receive the balls 17 are arrayed in a peripheral wall of the cage 18 along the circumferential direction. Further, as illustrated in FIG. 1, a curvature center O7 of an outer spherical surface 18a and a curvature center O8 of an inner spherical surface 18b match with each other.

In a state in which the outer joint member 13, the inner joint member 16, and the cage 18, which have the configurations described above, are assembled, the track grooves 12 of the outer joint member 13 and the track grooves 15 of the inner joint member 16, which correspond thereto, are inclined with respect to the axis line in opposite directions.

As described above, in the constant velocity universal joint, the track offset amounts are set to 0, and the adjacent track grooves 12A and 12B and the adjacent track grooves 15A and 15B alternately cross each other. Thus, forces act on the adjacent cage windows 18d alternately so that wedge angles in opposite directions are formed alternately. Therefore, the position of the cage is stabilized at a position of a bisecting plane of the inner and outer joint members 13 and 16. Therefore, spherical contact between the cage outer and inner spherical surfaces 18a and 18b is prevented. Accordingly, the constant velocity universal joint is smoothly operated under high load and in high speed rotation. As a result, heat generation is suppressed, and the durability can be enhanced. The number of the balls is set to eight, and thus, reduction in size and weight of the constant velocity universal joint can be attained while securing load capacity.

Further, the track groove 12 of the outer joint member 13 and the track groove 15 of the inner joint member 16, which is opposed to the track groove 12, construct a ball track which allows one ball 17 to be incorporated thereinto. In this case, the length of each ball track can be set to a length required for a front drive shaft.

Incidentally, in the fixed type constant velocity universal joint, as illustrated in FIG. 2 to FIG. 5, a chamfered portion 20 is formed on a joint opening end (track inlet end) of each of the track grooves 12 of the outer joint member 3. In this case, as illustrated in FIG. 4, the chamfered portions 20 of the track grooves 12 and 12 adjacent to each other in the circumferential direction are formed on opposing sides of the track inlet ends of the track grooves 12 and 12 arranged close to each other on the joint opening side. In other words, as illustrated in FIG. 2, the chamfered portions 20 are formed on counter-opposing sides of the track inlet ends of the track grooves 12 and 12 arranged apart from each other on the joint opening side.

Figure 13:
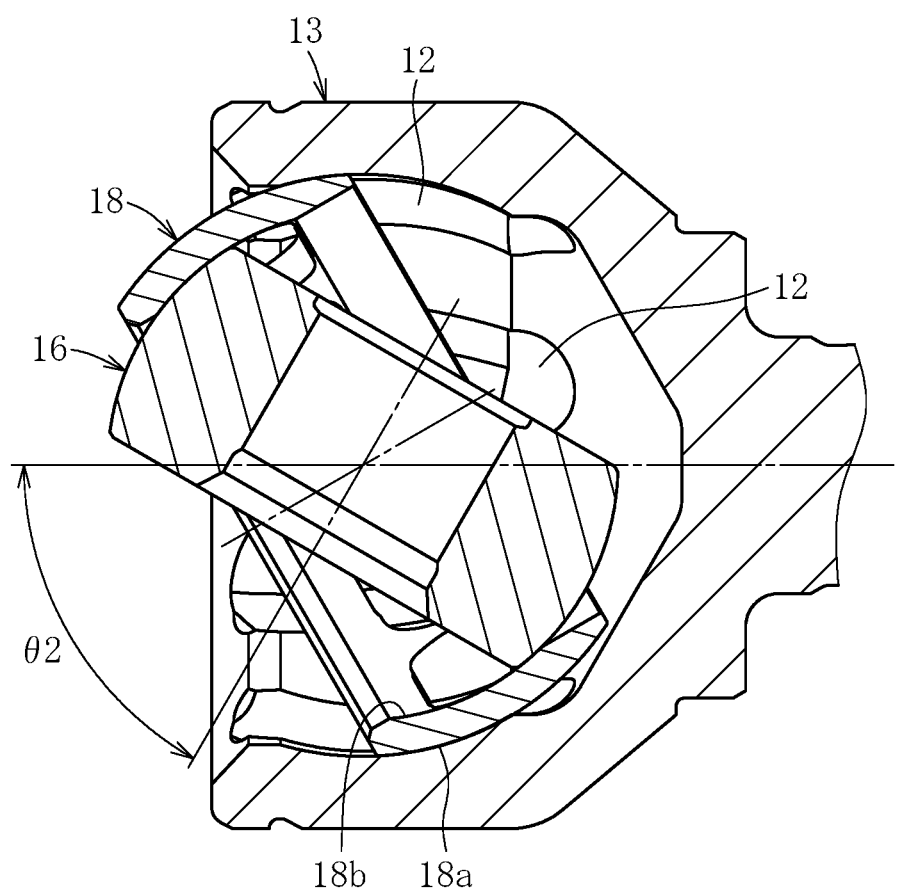
FIG. 13 is a sectional view for illustrating a state in which internal components of the fixed type constant velocity universal joint illustrated in FIG. 1 are inclined.
Figure 14:
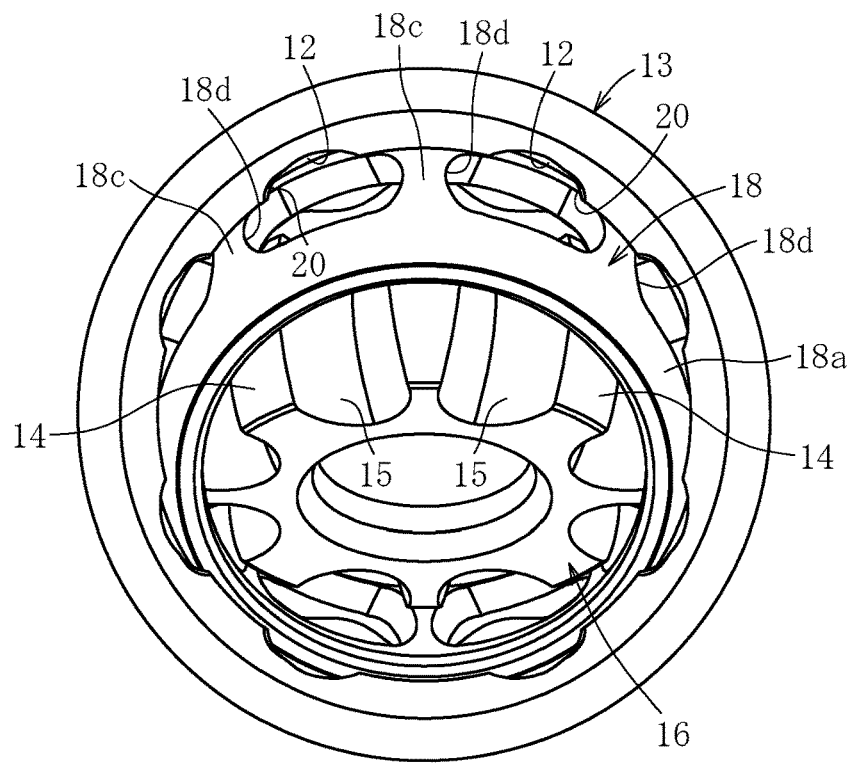
FIG. 14 is a perspective view for illustrating the state in which the internal components of the fixed type constant velocity universal joint illustrated in FIG. 1 are inclined.
Figure 15:
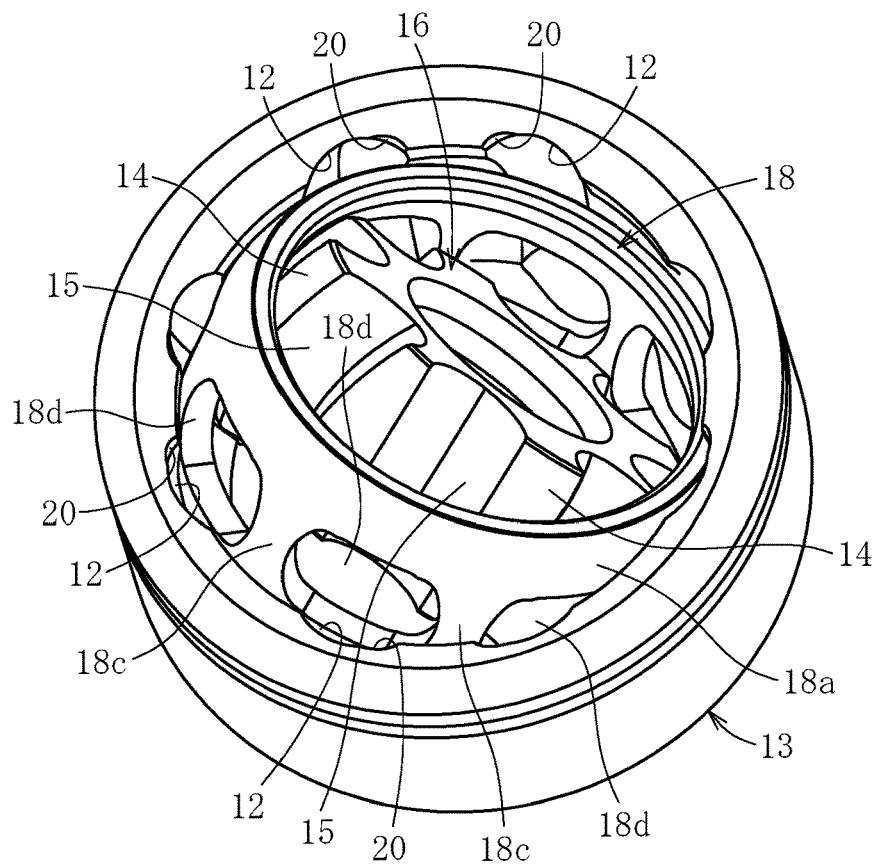
FIG. 15 is a perspective view for illustrating the state in which the internal components of the fixed type constant velocity universal joint illustrated in FIG. 1 are inclined.
Figure 16:
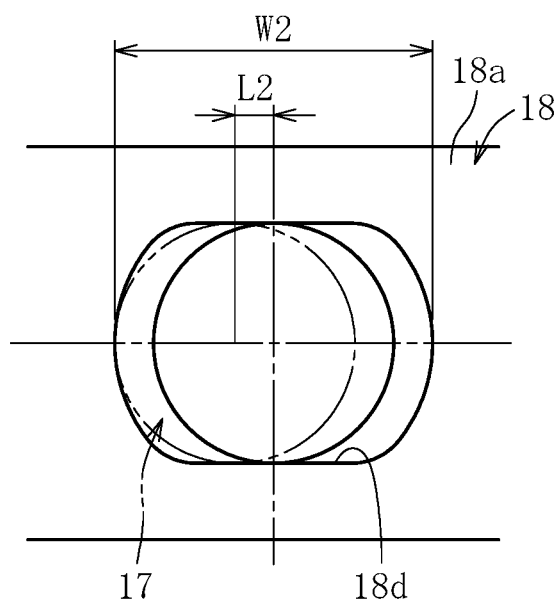
FIG. 16 is a main-part enlarged plan view for illustrating a relationship between a cage window of the cage and a ball of the fixed type constant velocity universal joint illustrated in FIG. 1.
Figure 17:
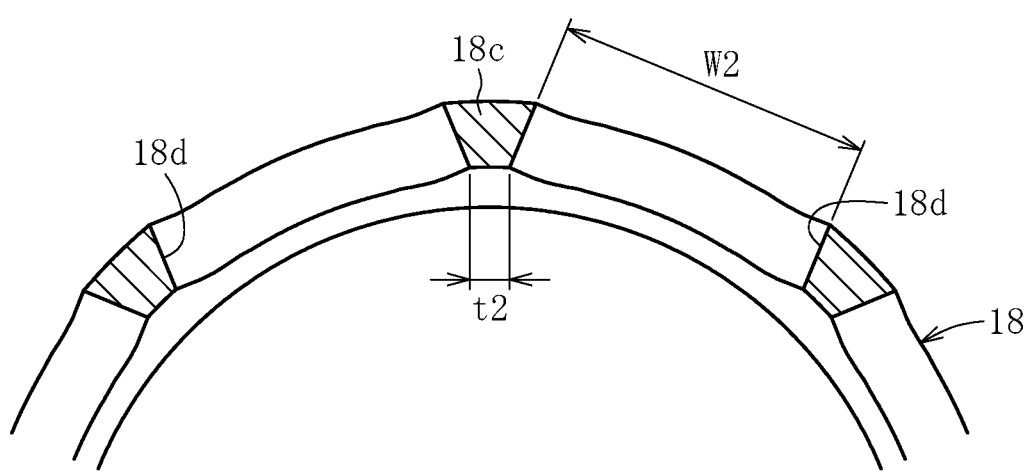
FIG. 17 is a main-part enlarged sectional view of the cage of the fixed type constant velocity universal joint illustrated in FIG. 1.

Next, a method of incorporating the balls 17 (see FIG. 1) in the constant velocity universal joint having the above-mentioned configuration is described. First, in the state in which the cage 18 and the inner joint member 16 are incorporated into the outer joint member 13, as illustrated in FIG. 13 to FIG. 15, the cage 18 and the inner joint member 16 are inclined with respect to the axial center of the outer joint member 13. With this, the pair of cage windows 18d of the cage 18, which are adjacent to each other along the circumferential direction, are exposed to the outside. In this case, a side on which a circumferential spherical surface width between the track grooves 15 and 15 adjacent to each other in the circumferential direction in the outer spherical surface of the inner joint member 16 is smaller is inclined toward the joint opening side.

Figure 38:
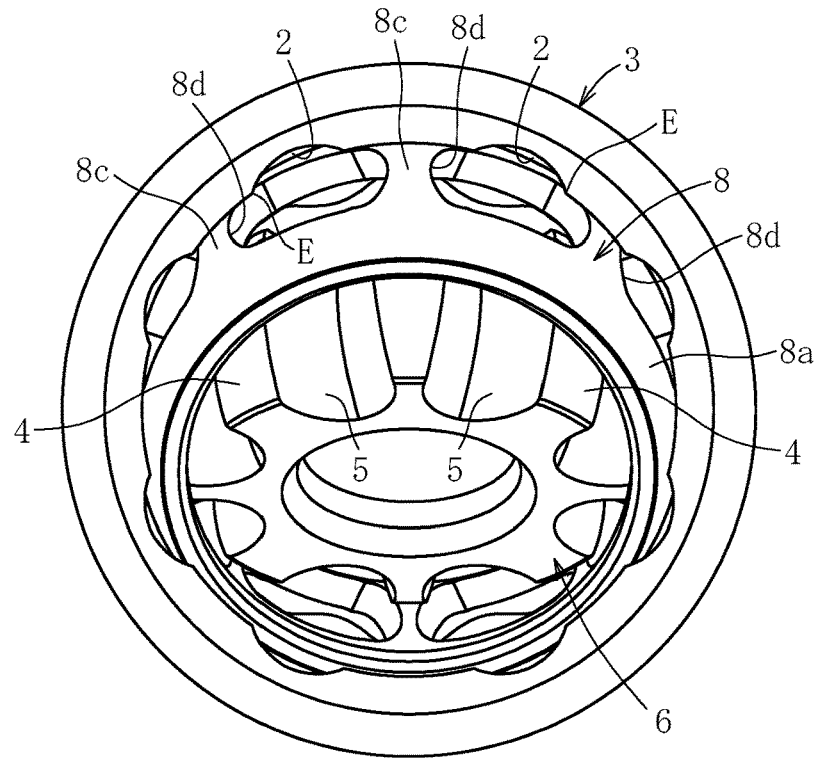
FIG. 38 is a perspective view for illustrating the state in which the balls are to be incorporated into the related-art fixed type constant velocity universal joint.
Figure 39:
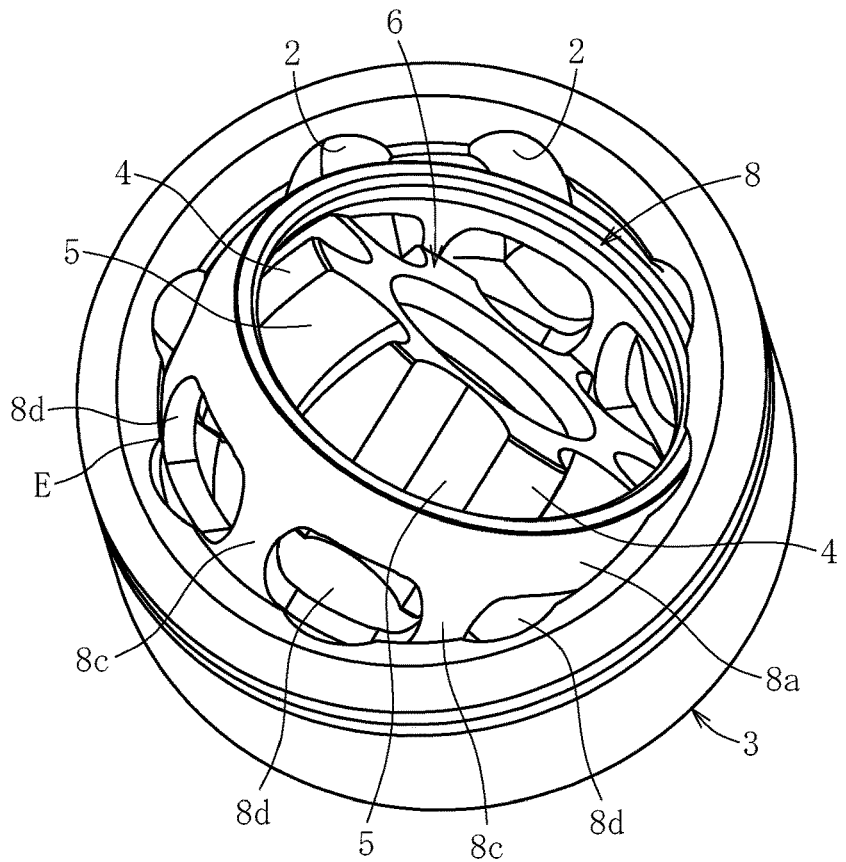
FIG. 39 is a perspective view for illustrating the state in which the balls are to be incorporated into the related-art fixed type constant velocity universal joint.
Figure 40:
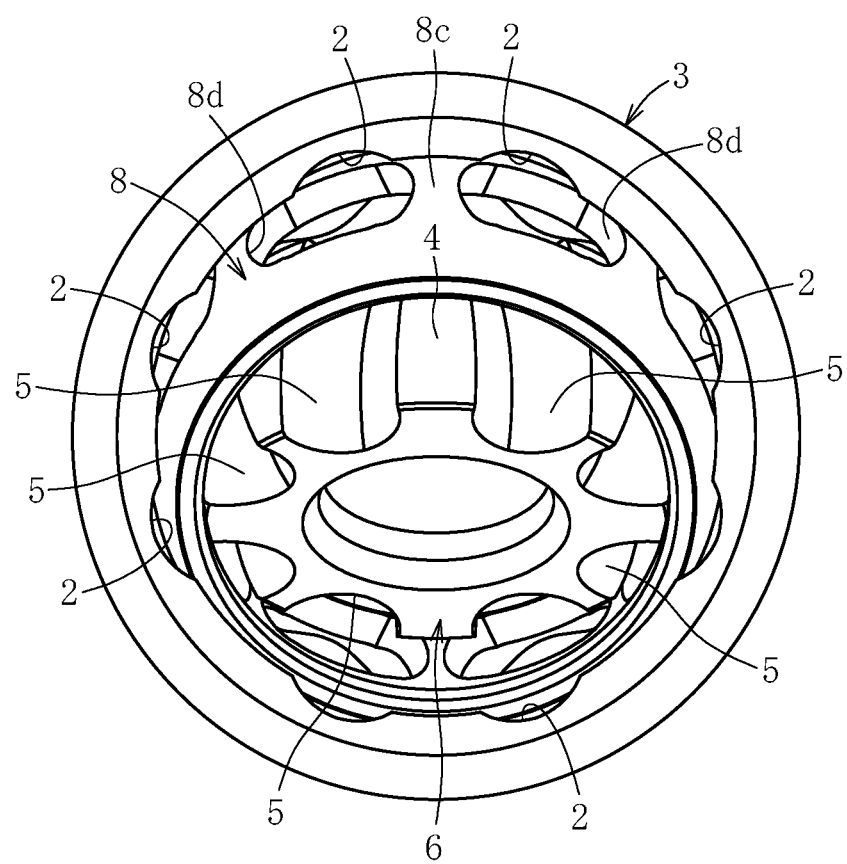
FIG. 40 is a perspective view for illustrating the state in which the balls are to be incorporated into the related-art fixed type constant velocity universal joint.

In this case, a spigot edge E of each of the track grooves of the outer joint member, which is illustrated in FIG. 38 and FIG. 39, is eliminated by the chamfered portion 20. Therefore, a space of the inlet spigot edge E of the outer joint member 13 and the cage window surface, which is required for incorporation of the ball, can be increased. Therefore, an operating angle required for the incorporation becomes smaller, and a movement amount L2 (see FIG. 16) of the ball in the circumferential direction can be reduced.

That is, at the time of the incorporation of the balls, an inclination angle θ2 formed when the inner joint member 16 is inclined with respect to the axial center of the outer joint member 13 as illustrated in FIG. 13 can be set smaller than the inclination angle θ1 (see FIG. 35) formed when the inner joint member 16 is inclined similarly in a case in which the chamfered portions 20 are not formed.

Figure 35:
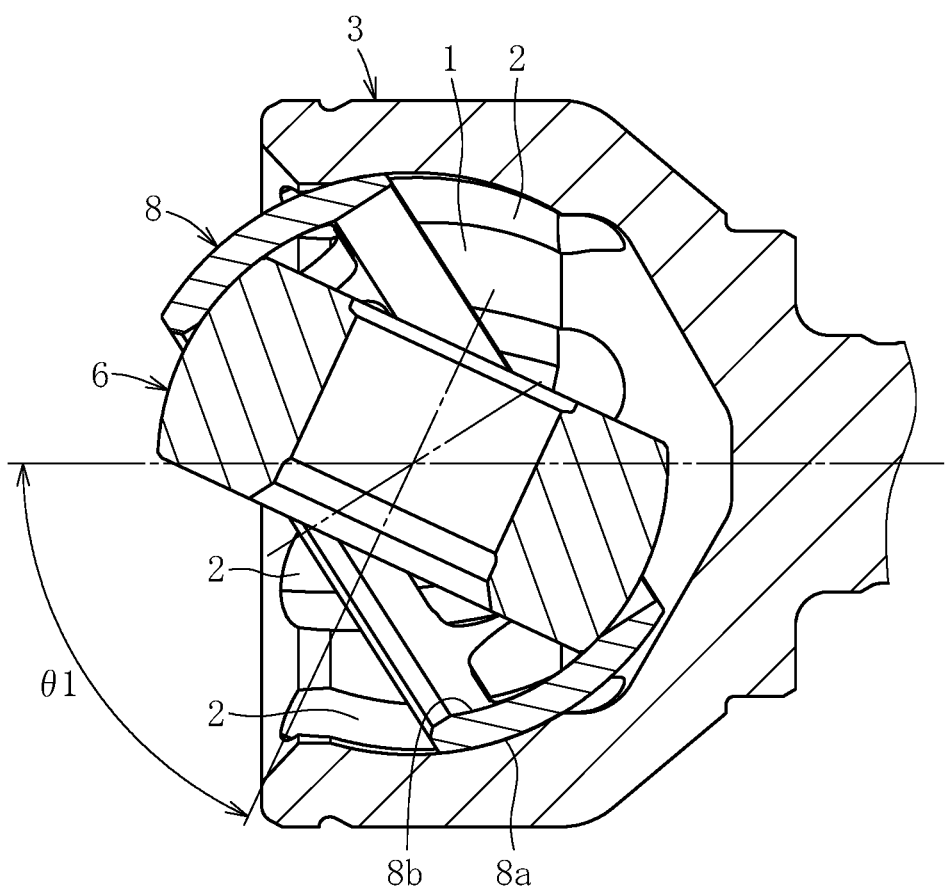
FIG. 35 is a sectional view for illustrating a state in which balls are to be incorporated into the related-art fixed type constant velocity universal joint.
Figure 36:
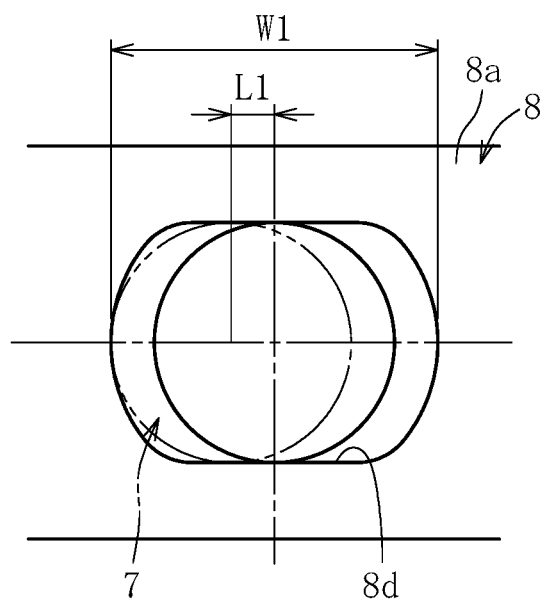
FIG. 36 is an explanatory view for illustrating a cage window of the cage of the related-art fixed type constant velocity universal joint.
Figure 37:
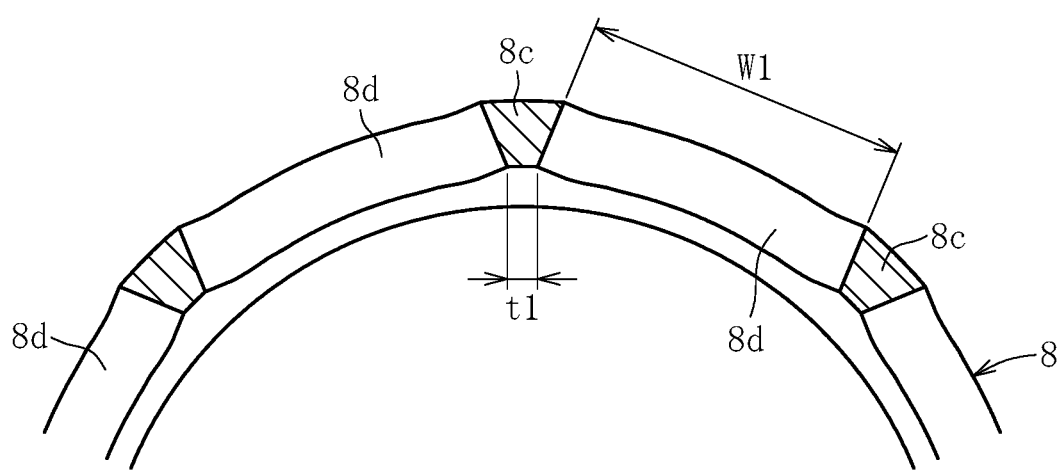
FIG. 37 is a main-part sectional view of the cage of the related-art fixed type constant velocity universal joint.

Further, the movement amount L2 (see FIG. 16) of the ball in the circumferential direction can be reduced as compared to a movement amount L1 (see FIG. 36) of the ball in the circumferential direction in the constant velocity universal joint (not having the chamfered portions 20) illustrated in FIG. 35. Thus, a cage window length W2 (see FIG. 16 and FIG. 17) of the cage 18 can be reduced as compared to a cage window length W1 (see FIG. 36 and FIG. 37) of the cage 8 in the constant velocity universal joint illustrated in FIG. 35. Therefore, a minimum circumferential length t2 of a cage window column 18c between the cage windows 18d (see FIG. 17) can be set larger than a minimum circumferential length t1 (see FIG. 37) of the cage window column 8c in the constant velocity universal joint illustrated in FIG. 36.

In this case, it is required to set the shape, the size, and the position of each of the chamfered portions so that the balls can be incorporated into the pair of track grooves 15 and 15 at the same time in a state in which a side on which the circumferential spherical surface width between the track grooves 15 and 15 adjacent to each other in the circumferential direction in the outer spherical surface 14 of the inner joint member 16 is smaller is inclined toward the joint opening side as illustrated in FIG. 14 and FIG. 15. With this, in the constant velocity universal joint, the balls 17 (see FIG. 1) can be incorporated into the two adjacent cage windows 18d at the same time. Therefore, when the balls 17 are to be incorporated two at a time, incorporation of eight balls requires only four times of incorporation of two balls. Accordingly, the assembly working time period can be significantly shortened, thereby being capable of enhancing the workability.

In particular, in the present invention, the chamfered portion 20 is formed at the track inlet of each of the track grooves 12 of the outer joint member 13. Thus, the space required for incorporation of the balls can be increased, and in addition, the inclination angles of the internal components comprising the cage 18 and the inner joint member 16 can be reduced, thereby being capable of enhancing the ease of incorporation of the balls 17. Further, the movement amount of the ball in the circumferential direction can be reduced, and thus, the length of the cage windows 18d of the cage 18 can be shortened, thereby being capable of enhancing the strength of the cage window column 18c between the cage windows 18d.

Figure 18:
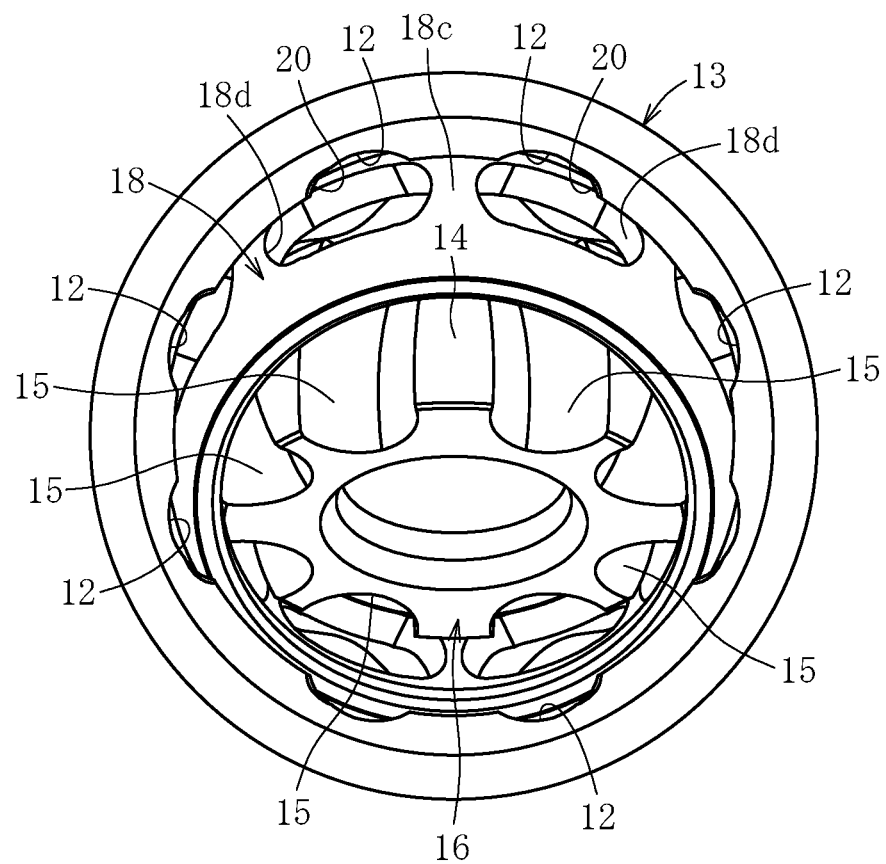
FIG. 18 is a perspective view for illustrating a state in which the internal components are inclined in another embodiment of the present invention.

Incidentally, in the embodiment, the side on which the circumferential spherical surface width between the track grooves 15 and 15 adjacent to each other in the circumferential direction in the outer spherical surface 14 of the inner joint member 16 is smaller is inclined toward the joint opening side. However, as illustrated in FIG. 18, a side on which the circumferential spherical surface width between the track grooves 15 and 15 adjacent to each other in the circumferential direction in the outer spherical surface 14 of the inner joint member 16 is larger may be inclined toward the joint opening side.

In this case, it is required to set the shape, the size, and the position of each of the chamfered portions so that the balls can be incorporated into the pair of track grooves 15 and 15 at the same time in a state in which the side on which the circumferential spherical surface width between the track grooves 15 and 15 adjacent to each other in the circumferential direction in the outer spherical surface 14 of the inner joint member 16 is smaller is inclined toward the joint opening side. With this, in the constant velocity universal joint, the balls 17 can be incorporated into the two adjacent pockets 18d at the same time. Therefore, the assembly working time period can be significantly shortened, thereby being capable of enhancing the workability.

Even in this case, as in the embodiment, the space required for incorporation of the balls can be increased, and in addition, the inclination angles of the internal components comprising the cage 18 and the inner joint member 16 can be reduced, thereby being capable of enhancing the ease of incorporation of the balls 17. In addition, the movement amount of the ball in the circumferential direction can be reduced, and thus, the length of the cage windows 18d of the cage 18 can be shortened, thereby being capable of enhancing the strength of the cage window column 18c between the cage windows 18d.

Figure 19:
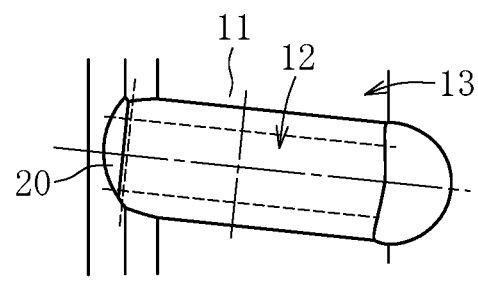
FIG. 19 is a plan view for illustrating another mode of a track groove.

Incidentally, in the fixed type constant velocity universal joint illustrated in FIG. 1, the chamfered portions 20 and 20 formed on the track grooves 12 and 12 of the outer joint member 13 are formed at the opposite positions on the joint opening ends of the track grooves 12 and 12 adjacent to each other along the circumferential direction. However, as illustrated in FIG. 19, the chamfered portion 20 may be formed over the entire length of the joint opening end of the track groove 12 of the outer joint member 13.

In the above-mentioned embodiment, the curvature center O1 of the track groove 12 of the outer joint member 13 and the curvature center O2 of the track groove 15 of the inner joint member 16 match with each other without being offset in the radial direction. In contrast, in FIG. 20, the curvature center O1 of the track groove 12 of the outer joint member 13 is offset in the radial direction, and in FIG. 21, the curvature center O2 of the track groove 15 of the inner joint member 16 is offset in the radial direction.

Figure 20:
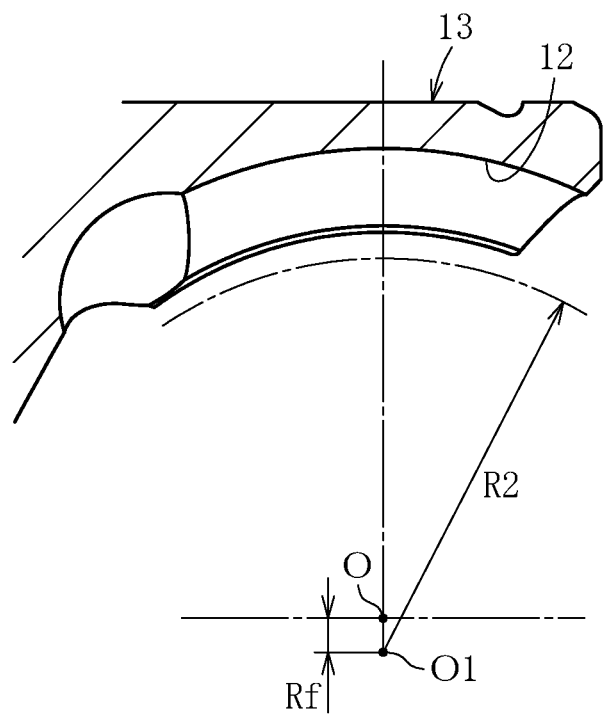
FIG. 20 is a sectional view of the outer joint member in a state in which a curvature center of the track groove is offset in a radial direction.
Figure 21:
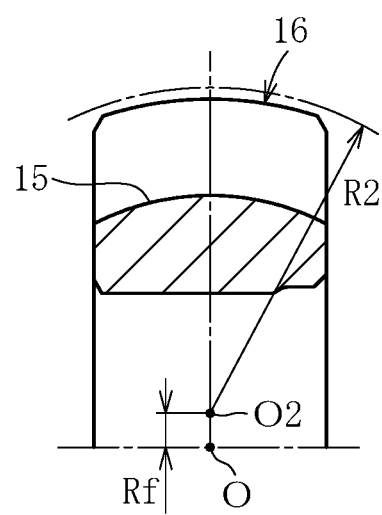
FIG. 21 is a sectional view of the inner joint member in a state in which a curvature center of a track groove is offset in the radial direction.
Figure 22:
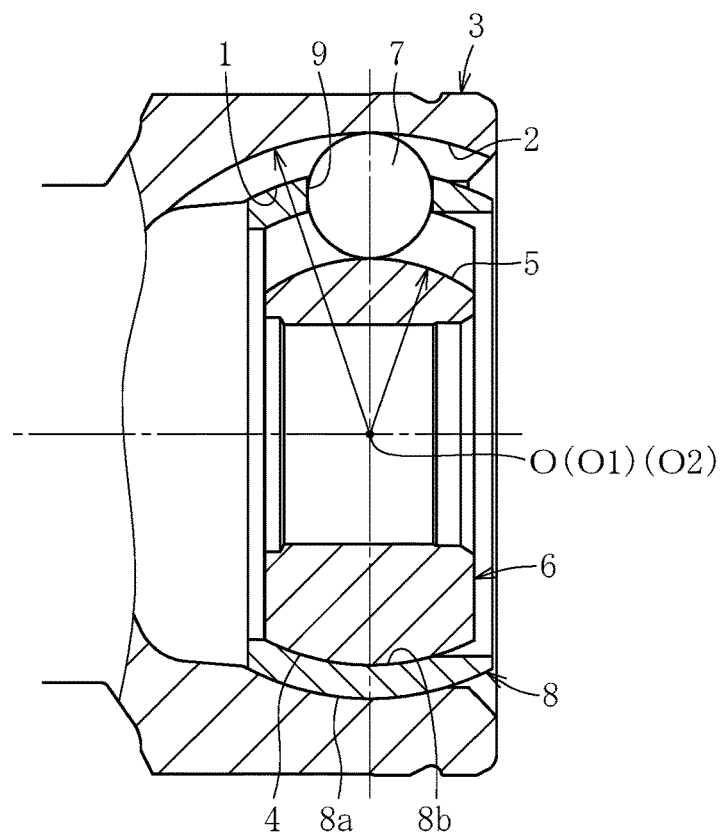
FIG. 22 is a sectional view of a related-art fixed type constant velocity universal joint.
Figure 23:
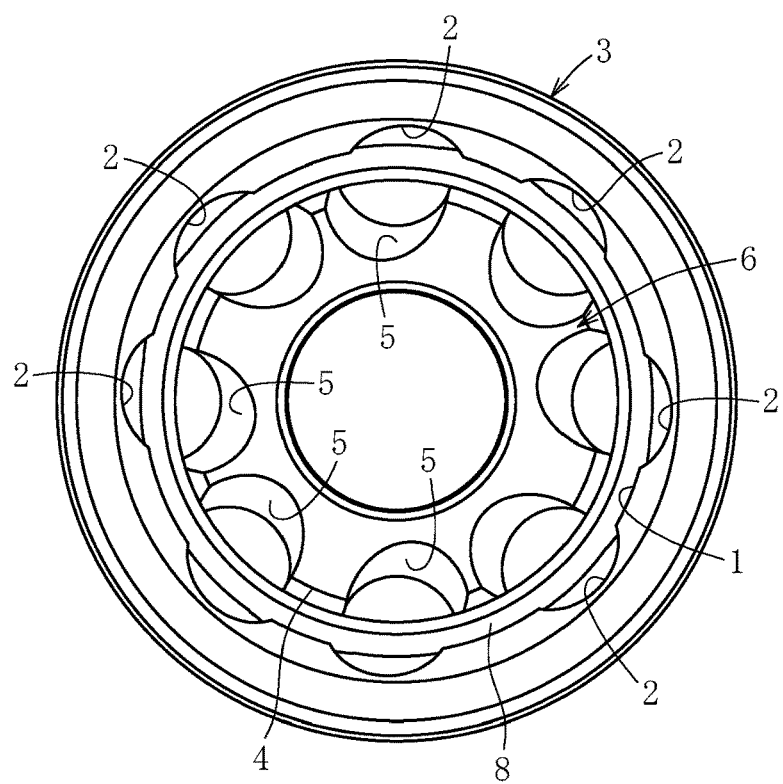
FIG. 23 is a front view of the related-art fixed type constant velocity universal joint.
Figure 24:
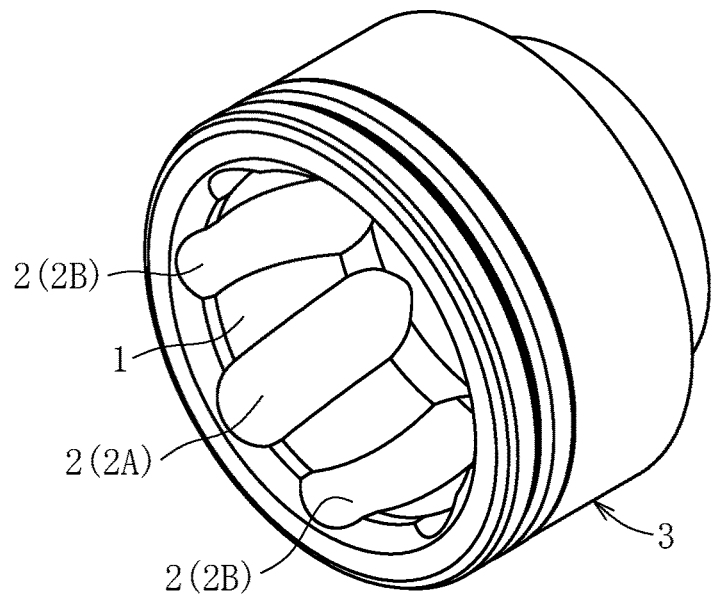
FIG. 24 is a perspective view of an outer joint member of the related-art fixed type constant velocity universal joint.
Figure 25:
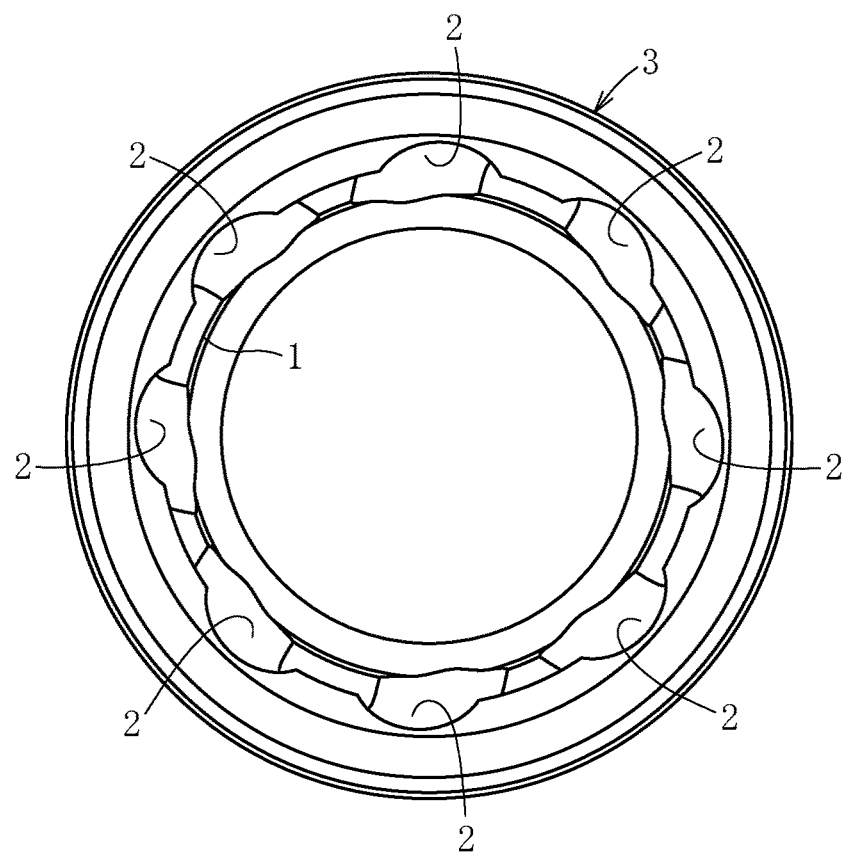
FIG. 25 is a front view of the outer joint member of the related-art fixed type constant velocity universal joint.
Figure 26:
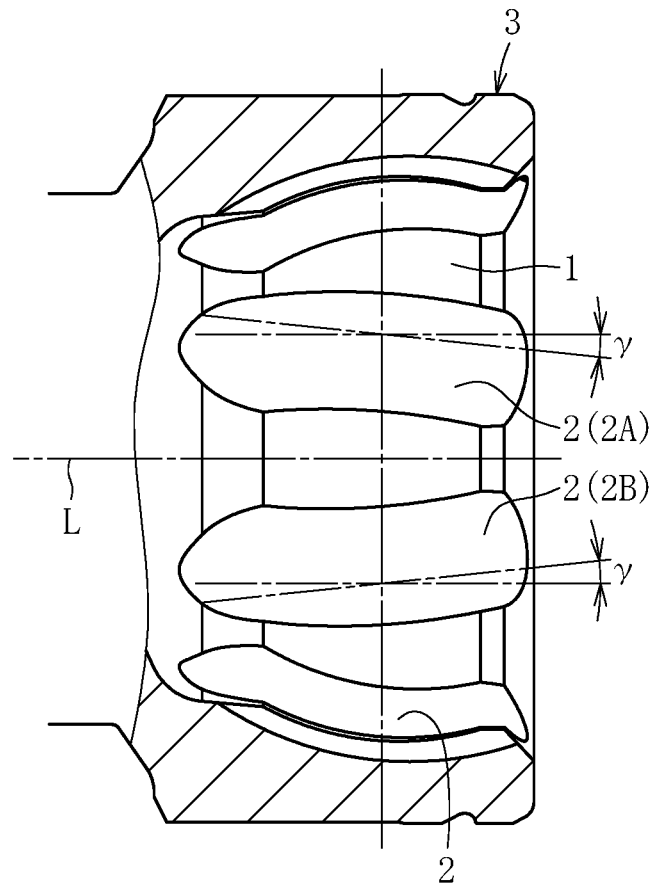
FIG. 26 is a sectional view of the outer joint member of the related-art fixed type constant velocity universal joint.
Figure 27:
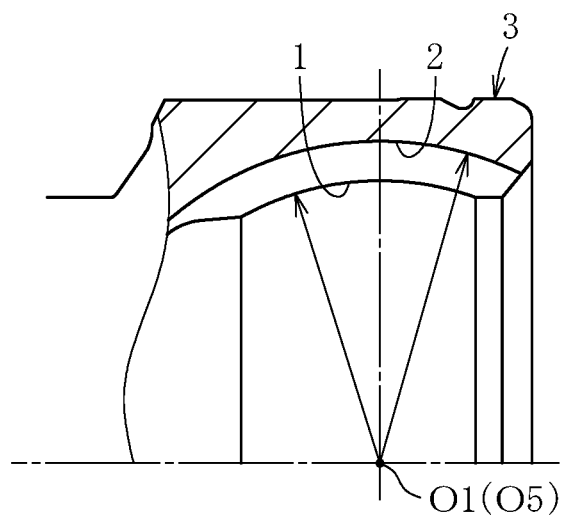
FIG. 27 is a main-part sectional view of the outer joint member of the related-art fixed type constant velocity universal joint.
Figure 28:
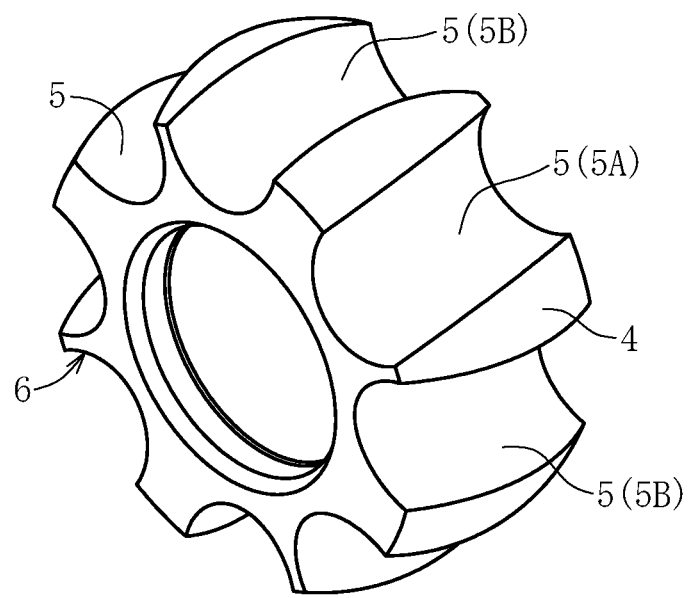
FIG. 28 is a perspective view of an inner joint member of the related-art fixed type constant velocity universal joint.
Figure 29:
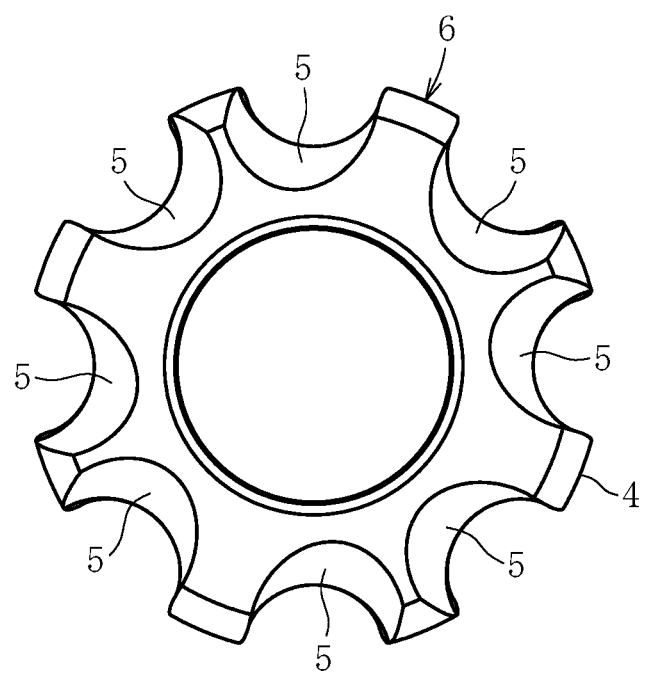
FIG. 29 is a front view of the inner joint member of the related-art fixed type constant velocity universal joint.
Figure 30:
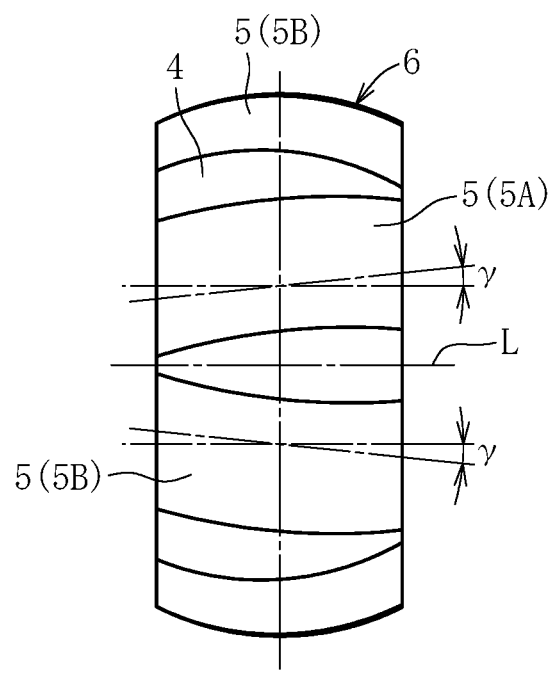
FIG. 30 is a side view of the inner joint member of the related-art fixed type constant velocity universal joint.
Figure 31:
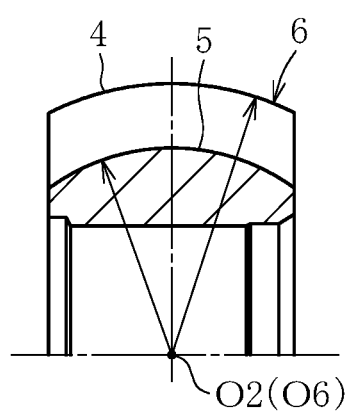
FIG. 31 is a main-part sectional view of the inner joint member of the related-art fixed type constant velocity universal joint.
Figure 32:
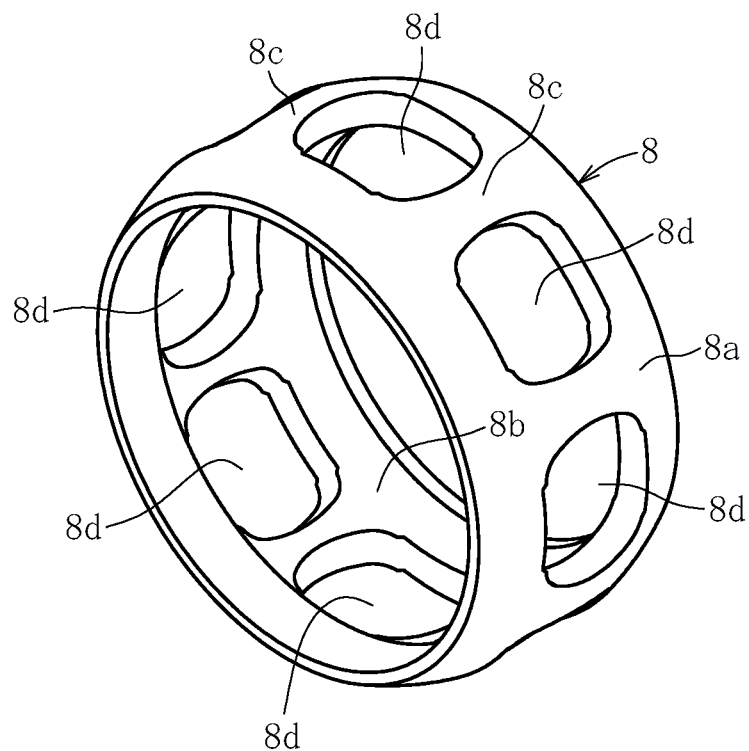
FIG. 32 is a perspective view of a cage of the related-art fixed type constant velocity universal joint.
Figure 33:
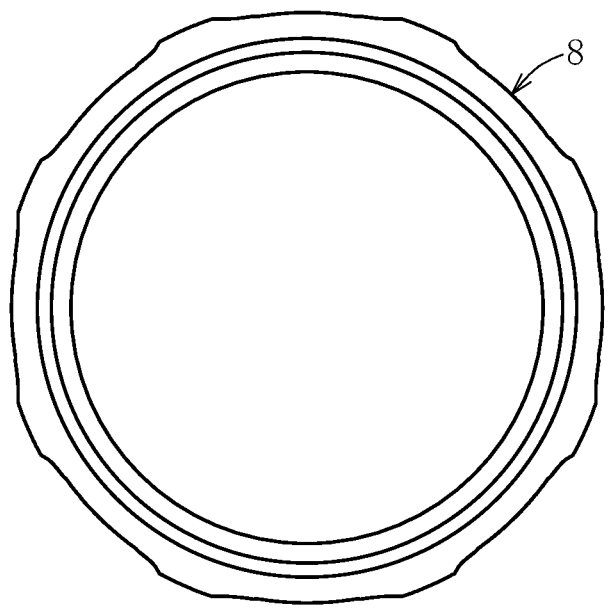
FIG. 33 is a front view of the cage of the related-art fixed type constant velocity universal joint.
Figure 34:
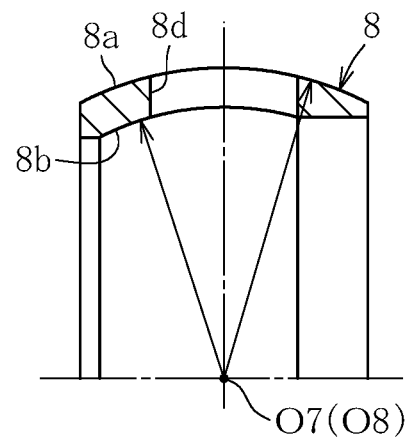
FIG. 34 is a main-part sectional view of the cage of the related-art fixed type constant velocity universal joint.

When a groove depth of the track groove 12 of the outer joint member 13 is to be secured, as illustrated in FIG. 20, the curvature center O1 of the track groove 12 of the outer joint member 13 is offset in a negative direction in the radial direction. When a groove depth of the track groove 15 of the inner joint member 16 is to be secured, as illustrated in FIG. 21, the curvature center O2 of the track groove 15 of the inner joint member 16 is offset in a positive direction in the radial direction. In FIG. 20 and FIG. 21, R2 indicates a center raceway of the ball 17 (see FIG. 1) when the track center is offset with respect to the spherical surface center by Rf in the radial direction.

The track center is offset in the radial direction as described above so that the groove depths of the track grooves 12 and 15 can be varied. Therefore, there can be obtained a structure capable of preventing the balls 17 from dropping off the track grooves 12 and 15, or a structure capable of enhancing the stiffness of the outer joint member 13 and the inner joint member 16.

The embodiments of the present invention have been described above. The present invention is not limited to the embodiments, and various modifications may be made thereto. The inclination angle γ of each of the track grooves 12 and 15 may be variously modified as long as extruding forces that act on the balls 17 arranged in the adjacent ball tracks act in opposite directions and within a range in which the operation of the constant velocity universal joint is not inhibited (from 4° to 16°). Further, in a case in which the offset in the radial direction is provided, the curvature radius may be increased or reduced as compared to a case in which the offset in the radial direction is not provided.

INDUSTRIAL APPLICABILITY

The fixed type constant velocity universal joint according to the embodiments of the present invention may be used not only in the drive shaft, but also in a propeller shaft configured to transmit rotational driving power from a transmission to a differential in a four-wheel drive vehicle (4WD vehicle) or a rear-wheel drive vehicle (FR vehicle).

REFERENCE SIGNS LIST 11 inner spherical surface
12, 12A, 12B track groove
13 outer joint member
14 outer spherical surface
15, 15A, 15B track groove
16 inner joint member
17 ball
18 cage
18d cage window
20 chamfered portion

The invention claimed is:

1. A fixed type constant velocity universal joint, comprising:
    an outer joint member having eight track grooves formed in an inner spherical surface thereof;
    an inner joint member having eight track grooves, which are paired with the track grooves of the outer joint member, and are formed in an outer spherical surface thereof;
    eight balls, which are interposed between the track grooves of the outer joint member and the track grooves of the inner joint member, and are configured to transmit torque; and
    a cage, which is interposed between the inner spherical surface of the outer joint member and the outer spherical surface of the inner joint member, and comprises cage windows configured to retain the balls,
    wherein an axial offset amount of a curvature center of each of the track grooves of the outer joint member and an axial offset amount of a curvature center of the inner spherical surface of the outer joint member are set to 0, and an axial offset amount of a curvature center of each of the track grooves of the inner joint member and an axial offset amount of a curvature center of the outer spherical surface of the inner joint member are set to 0,
    wherein the track grooves of the outer joint member and the track grooves of the inner joint member are each inclined with respect to an axis line,
    wherein the track grooves adjacent to each other in a circumferential direction are inclined in opposite directions,
    wherein the track grooves of the outer joint member and the track grooves of the inner joint member, which are opposed thereto, are inclined with respect to the axis line in opposite directions,
    wherein a chamfered portion is formed on a track inlet end of each of the track grooves of the outer joint member, the track inlet ends each being formed on a side at which a circumferential spherical surface width between the track grooves adjacent to each other in the circumferential direction in the inner spherical surface of the outer joint member becomes small, and
    wherein, in a state in which the cage and the inner joint member are inclined with respect to the outer joint member with a side at which a circumferential spherical surface width between the track grooves adjacent to each other in the circumferential direction in the outer spherical surface of the inner joint member becomes small inclined toward a joint open side so that two cage windows are exposed from the outer joint member, the balls are enabled to be incorporated into the two cage windows at the same time through the chamfered portions on the track inlet ends.

2. The fixed type constant velocity universal joint according to claim 1, wherein the curvature center of the each of the track grooves of the outer joint member and the curvature center of the each of the track grooves of the inner joint member are offset in a radial direction with respect to a joint center.

3. The fixed type constant velocity universal joint according to claim 2,
    wherein the track grooves of the outer joint member and the track grooves of the inner joint member, which are opposed to the track grooves of the outer joint member, construct ball tracks which each allow one of the balls to be incorporated thereinto, and
    wherein a length of each of the ball tracks is set to a length for a front drive shaft.

4. The fixed type constant velocity universal joint according to claim 1,
    wherein the track grooves of the outer joint member and the track grooves of the inner joint member, which are opposed to the track grooves of the outer joint member, construct ball tracks which each allow one of the balls to be incorporated thereinto, and
    wherein a length of each of the ball tracks is set to a length for a front drive shaft.

5. A fixed type constant velocity universal joint, comprising:
    an outer joint member having eight track grooves formed in an inner spherical surface thereof;
    an inner joint member having eight track grooves, which are paired with the track grooves of the outer joint member, and are formed in an outer spherical surface thereof;
    eight balls, which are interposed between the track grooves of the outer joint member and the track grooves of the inner joint member, and are configured to transmit torque; and
    a cage, which is interposed between the inner spherical surface of the outer joint member and the outer spherical surface of the inner joint member, and comprises cage windows configured to retain the balls,
    wherein an axial offset amount of a curvature center of each of the track grooves of the outer joint member and an axial offset amount of a curvature center of the inner spherical surface of the outer joint member are set to 0, and an axial offset amount of a curvature center of each of the track grooves of the inner joint member and an axial offset amount of a curvature center of the outer spherical surface of the inner joint member are set to 0,
    wherein the track grooves of the outer joint member and the track grooves of the inner joint member are each inclined with respect to an axis line,
    wherein the track grooves adjacent to each other in a circumferential direction are inclined in opposite directions,
    wherein the track grooves of the outer joint member and the track grooves of the inner joint member, which are opposed thereto, are inclined with respect to the axis line in opposite directions,
    wherein a chamfered portion is formed on a track inlet end of each of the track grooves of the outer joint member, the track inlet ends each being formed on a side at which a circumferential spherical surface width between the track grooves adjacent to each other in the circumferential direction in the inner spherical surface of the outer joint member becomes large, and wherein, in a state in which the cage and the inner joint member are inclined with respect to the outer joint member with a side at which a circumferential spherical surface width between the track grooves adjacent to each other in the circumferential direction in the outer spherical surface of the inner joint member becomes large inclined toward a joint opening side so that two cage windows are exposed from the outer joint member, the balls are enabled to be incorporated into the two cage windows at the same time through the chamfered portions on the track inlet ends.

6. The fixed type constant velocity universal joint according to claim 5, wherein the curvature center of the each of the track grooves of the outer joint member and the curvature center of the each of the track grooves of the inner joint member are offset in a radial direction with respect to a joint center.

7. The fixed type constant velocity universal joint according to claim 6, wherein the track grooves of the outer joint member and the track grooves of the inner joint member, which are opposed to the track grooves of the outer joint member, construct ball tracks which each allow one of the balls to be incorporated thereinto, and wherein a length of each of the ball tracks is set to a length for a front drive shaft.

8. The fixed type constant velocity universal joint according to claim 5, wherein the track grooves of the outer joint member and the track grooves of the inner joint member, which are opposed to the track grooves of the outer joint member, construct ball tracks which each allow one of the balls to be incorporated thereinto, and wherein a length of each of the ball tracks is set to a length for a front drive shaft.

* * * * *